United States Patent
Shan et al.

(10) Patent No.: US 11,153,233 B2
(45) Date of Patent: Oct. 19, 2021

(54) NETWORK PACKET RECEIVING APPARATUS AND METHOD

(71) Applicant: Realtek Semiconductor Corporation, Hsinchu (TW)

(72) Inventors: Xi-Cheng Shan, Suzhou (CN); Jie Wang, Suzhou (CN); Chang-Chun Li, Hsinchu (TW); Chia-Hung Lin, Hsinchu (TW); Guan-Yu Liu, Suzhou (CN); Shan Che, Suzhou (CN); Jian-Jun Wang, Suzhou (CN); Jun-Da Shi, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/936,818

(22) Filed: Jul. 23, 2020

(65) Prior Publication Data

US 2021/0029062 A1    Jan. 28, 2021

(30) Foreign Application Priority Data

Jul. 26, 2019    (CN) .......................... 201910681766.3

(51) Int. Cl.
*H04L 12/28*    (2006.01)
*H04L 12/861*    (2013.01)
(Continued)

(52) U.S. Cl.
CPC .......... *H04L 49/9005* (2013.01); *G06F 13/28* (2013.01); *H04L 49/901* (2013.01); *H04L 49/9084* (2013.01)

(58) Field of Classification Search
CPC ... H04L 49/9005; H04L 49/90; H04L 49/901; H04L 47/10; H04L 47/39; H04L 47/50;
(Continued)

(56) References Cited

U.S. PATENT DOCUMENTS

| 5,548,587 | A | * | 8/1996 | Bailey | ................ | H04Q 11/0478 370/395.7 |
| 6,594,701 | B1 | * | 7/2003 | Forin | ................... | G06F 12/1081 709/232 |

(Continued)

FOREIGN PATENT DOCUMENTS

WO    0041365 A1    7/2000

*Primary Examiner* — Abdelnabi O Musa
(74) *Attorney, Agent, or Firm* — Locke Lord LLP; Tim Tingkang Xia, Esq.

(57) ABSTRACT

A network packet receiving device that includes packet queues, a credit allocation circuit and a credit management circuit is provided. Each of the packet queues corresponds to a packet transmission channel and receives packets. The credit allocation circuit calculates packet amount of each of the packet queues to control the descriptor credit of each of the packet queues within a credit range. The credit management circuit points each of public entries of a public link list to one of descriptors in a single descriptor buffer. The credit management circuit further receives a credit requesting command from the packet queues to assign the descriptors to the packet queues through the public entries under the condition that the descriptor credit is within a credit range such that a DMA circuit performs a DMA operation on the packets according to the descriptors.

10 Claims, 5 Drawing Sheets

(51) Int. Cl.
*H04L 12/879* (2013.01)
*G06F 13/28* (2006.01)

(58) Field of Classification Search
CPC . G06F 13/28; G06F 9/455; G06F 3/06; G06F 13/42; G06F 13/40
See application file for complete search history.

(56) References Cited

U.S. PATENT DOCUMENTS

| | | | |
|---|---|---|---|
| 9,755,983 B1* | 9/2017 | Swartzentruber | H04L 47/39 |
| 2012/0253780 A1* | 10/2012 | Talia | H04L 47/122 |
| | | | 703/23 |
| 2014/0181241 A1* | 6/2014 | Manula | H04L 67/2842 |
| | | | 709/217 |
| 2016/0011996 A1* | 1/2016 | Asaad | G06F 12/0862 |
| | | | 710/308 |
| 2016/0055112 A1* | 2/2016 | Mirza | G06F 13/4221 |
| | | | 710/306 |
| 2017/0147251 A1* | 5/2017 | Lu | H04L 49/901 |
| 2018/0248813 A1* | 8/2018 | Zheng | H04L 49/90 |

\* cited by examiner

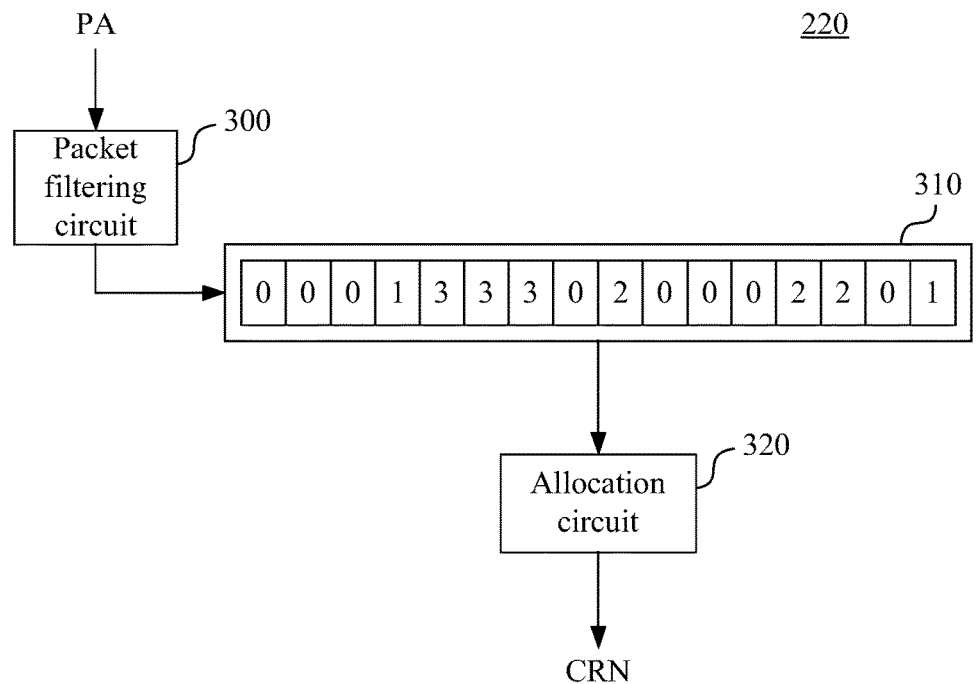
FIG. 3
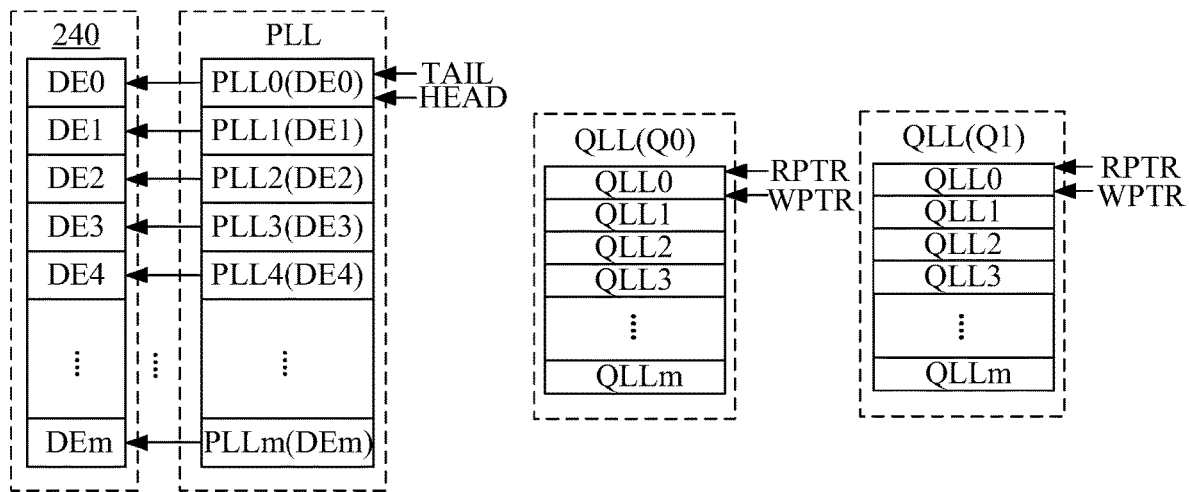
FIG. 4A
FIG. 5A

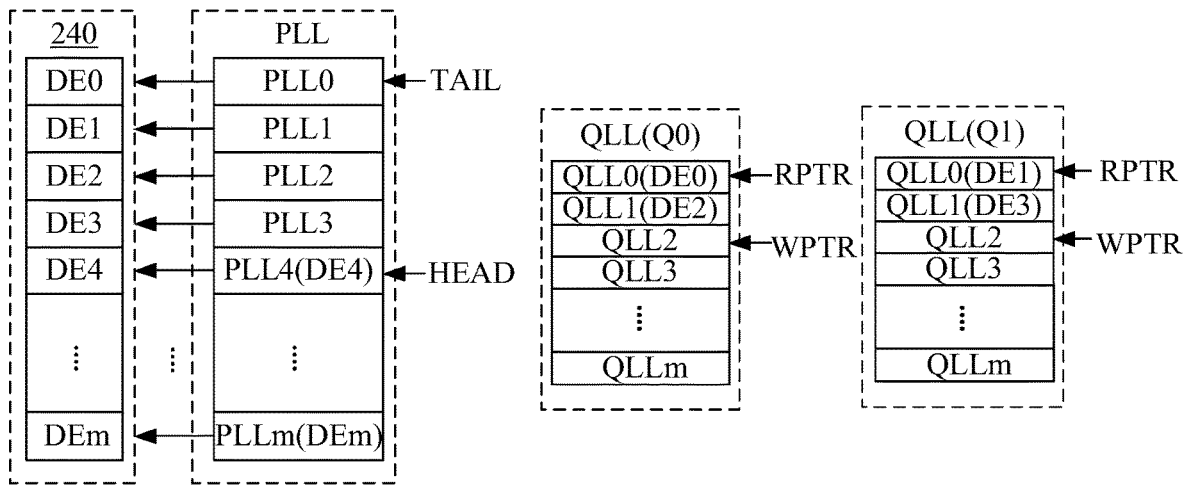
FIG. 4B
FIG. 5B
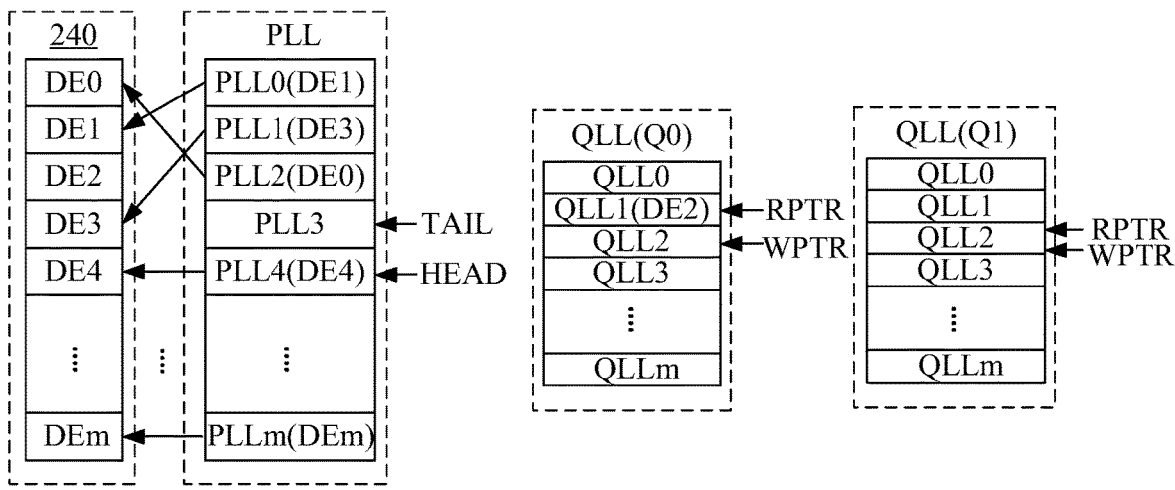
FIG. 4C
FIG. 5C

NETWORK PACKET RECEIVING APPARATUS AND METHOD

RELATED APPLICATIONS

This application claims priority to China Application Serial Number 201910681766.3, filed Jul. 26, 2019, which is herein incorporated by reference.

BACKGROUND

Field of Disclosure

The present disclosure relates to network packet receiving technology. More particularly, the present disclosure relates to a network packet receiving apparatus and a network packet receiving method.

Description of Related Art

Electronic devices communicate by exchanging packets through their network cards. In applications such as large servers, a plurality of operation systems may be executed simultaneously and network packets transmission is accomplished the through different channels. Under such use case, the network card is required to configure groups of hardware that correspond to different channels for processing those packets, resulting in the waste of the hardware resource.

Accordingly, what is needed is a network packet receiving apparatus and a network packet receiving method for addressing the above issues.

SUMMARY

An aspect of the present disclosure is to provide an apparatus that includes a plurality of packet queues, a credit allocation circuit and a credit management circuit. Each of the packet queues is corresponding to a packet transmission channel and is configured to receive a plurality of packets. The credit allocation circuit is configured to calculate a packet amount of each of the packet queues, determine whether the packet amount exceeds an amount range of each of the packet queues and further control an available descriptor credit of each of the packet queues to be within a credit range. The credit management circuit is configured to point each of a plurality of public entries of a public link list to one of a plurality of descriptors each stored in one of a plurality of buffer entries of a single descriptor buffer. The credit management circuit is further configured to receive a credit requesting command corresponding to the packet queues for controlling the packet queues to share the single descriptor buffer, wherein under the condition that the available descriptor credit is within the credit range, the credit management circuit assigns the descriptors to the packet queues by using the public entries, enabling a direct memory access (DMA) circuit to perform a DMA operation on the packets according to the descriptors assigned to the packet queues.

Another aspect of the present disclosure is to provide a method that includes the steps outlined below. A plurality of packets are received by a plurality of packet queues each corresponding to a packet transmission channel. A packet amount of each of the packet queues is calculated, whether the packet amount exceeds an amount range of each of the packet queues is determined and an available descriptor credit of each of the packet queues is further controlled within a credit range by a credit allocation circuit. Each of a plurality of public entries of a public link list is pointed to one of a plurality of descriptors each stored in one of a plurality of buffer entries of a single descriptor buffer by a credit management circuit. A credit requesting command corresponding to the packet queues is received by the credit management circuit. The packet queues is controlled to share the single descriptor buffer by the credit management circuit and assigning the descriptors to the packet queues by using the public entries under the condition that the available descriptor credit is within the credit range. A DMA operation is performed by a DMA circuit on the packets according to the descriptors assigned to the packet queues.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 3 is a more detailed block diagram of the credit allocation circuit in FIG. 2 in an embodiment of the present invention;

FIGS. 4A-4D are diagrams illustrating the link list and the single descriptor buffer under different operation stages in an embodiment of the present invention;

FIGS. 5A-5D are diagrams illustrating the packet queues corresponding to Q0 and Q1 under different operation stages in an embodiment of the present invention.

DETAILED DESCRIPTION

Figure 1:
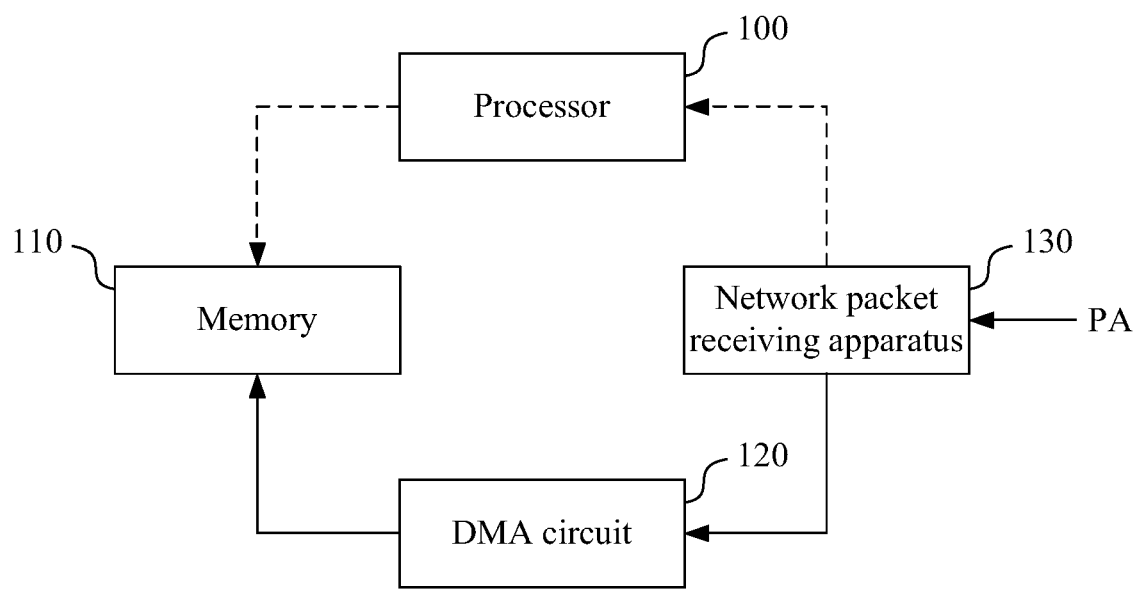
FIG. 1 is a block diagram of a computer system in an embodiment of the present invention.

Reference will now be made in detail to the present embodiments of the disclosure, examples of which are illustrated in the accompanying drawings. Wherever possible, the same reference numbers are used in the drawings and the description to refer to the same or like parts.

Reference is now made to FIG. 1. FIG. 1 is a block diagram of a computer system 1 in an embodiment of the present invention. The computer system 1 includes a processor 100, a memory 110, a direct memory access (DMA) circuit 120 and a network packet receiving apparatus 130.

In an embodiment, the processor 100 is electrically coupled to the memory 110, the DMA circuit 120 and the network packet receiving apparatus 130 and is configured to process the data from different circuit modules or apparatus in the computer system 1. The memory 110 can be such as, but not limited to a dynamic random access memory (DRAM) and is configured to store data that can be accessed by the processor 100.

In an embodiment, the network packet receiving apparatus 130 can be such as, but not limited to a network card configured to receive packets PA. When the computer system 1 does not include the DMA circuit 120, the network packet receiving apparatus 130 needs to deliver an interrupt to notify the processor 100 such that the processor 100 receives the packets PA and stores the packets PA in the memory 110. Further, the processor 100 accesses the packets PA from the memory 110 to perform processing. Such a packet processing method is illustrated as a path using a dashed line in FIG. 1.

However, a large amount of packets PA cause the network packet receiving apparatus 130 to keep delivering the interrupt such that the processor 100 is not able to handle other processes. As a result, by disposing the DMA circuit 120, the packets PA received by the network packet receiving apparatus 130 can be transmitted to and stored in the memory 110 without delivering the interrupt and being processed by the processor 100. Such a packet processing method is illustrated as a path using a solid line in FIG. 1.

Figure 2:
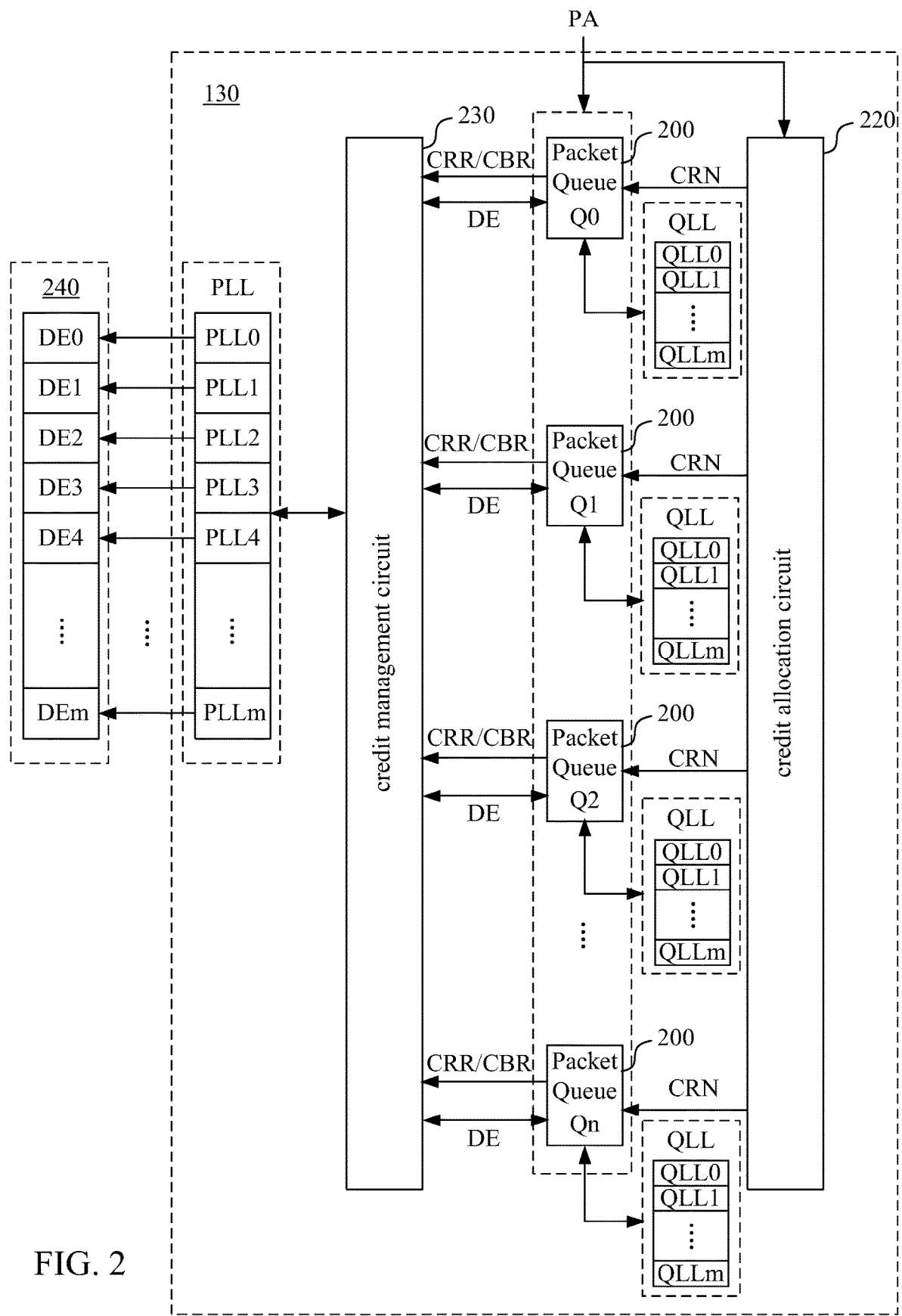
FIG. 2 is a detailed block diagram of the network packet receiving apparatus in FIG. 1 in an embodiment of the present invention.
Figures 4D, 5D:
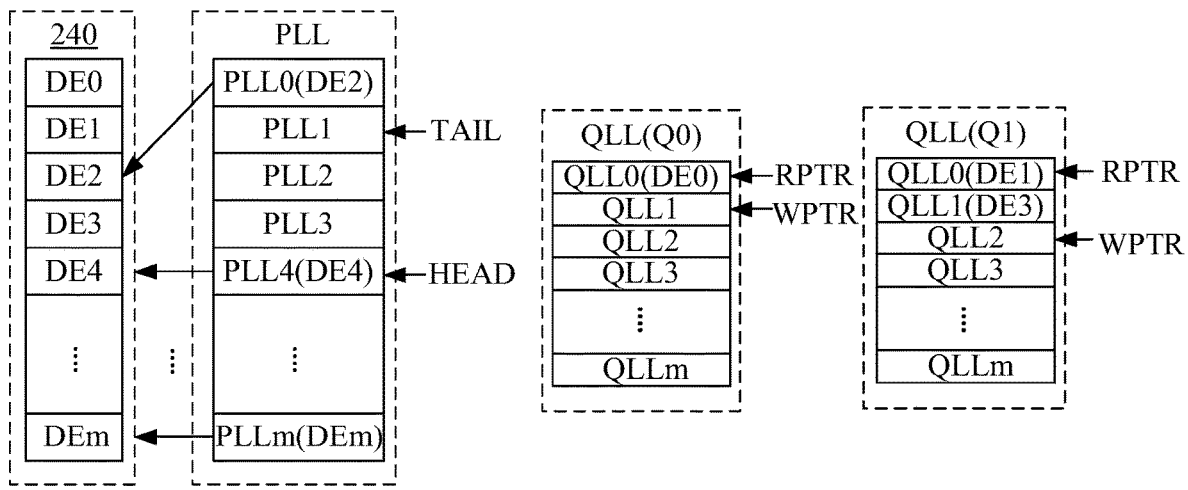

Reference is now made to FIG. 2. FIG. 2 is a detailed block diagram of the network packet receiving apparatus 130 in FIG. 1 in an embodiment of the present invention. The network packet receiving apparatus 130 includes a plurality of packet queues 200, a credit allocation circuit 220 and a credit management circuit 230.

Each of the packet queues 200 is corresponding to a packet transmission channel. In FIG. 2, n packet queues 200 are illustrated and are respectively labeled as Q0, Q1, Q2, . . . and Qn. In an embodiment, each of the packet queues 200 is a first in first out (FIFO) queue.

In an embodiment, the processor 100 illustrated in FIG. 1 can operate a plurality of operation systems at the same time. As a result, the network packet receiving apparatus 130 allocates a media access control address (MAC address) for each of a plurality of different operation systems and disposes the packet queues 200 each corresponding to one MAC address as the storages and the transmission channels of the packets. As a result, each of the packet queues 200 serves to receive the corresponding packets PA according to a specific channel.

The credit allocation circuit 220 is configured to calculate a packet amount of each of the packet queues 200, determine whether the packet amount exceeds an amount range of each of the packet queues 200 and further control an available descriptor credit CRN of each of the packet queues 200 within a credit range.

On the other hand, within the available descriptor credit CRN of each of the packet queues 200 corresponds to, the credit management circuit 230 is configured to assign descriptors DE to the packet queues 200 according to the credit requesting command CRR of each of the packet queues 200. The DMA circuit 120 in FIG. 1 can further perform DAM operation on the packets PA according to the assigned descriptors DE of the packet queues 200. More specifically, in an embodiment, the DMA circuit 120 can access the packets PA stored in the packet queues 200 according to the descriptors DE and store the packets PA in the memory 110.

The configuration and operation of the credit allocation circuit 220 and the credit management circuit 230 are described in detail in the following paragraphs.

Reference is now made to FIG. 3. FIG. 3 is a more detailed block diagram of the credit allocation circuit 220 in FIG. 2 in an embodiment of the present invention. In an embodiment, the credit allocation circuit 220 includes a packet filtering circuit 300, a packet numbering queue 310 and an allocation circuit 320.

The packet filtering circuit 300 is configured to determine a plurality of queue numberings according to the packet queues 200 that the packets PA belong to, wherein each of the queue numberings corresponds to one of the packet queues 200. Taking the packet queues 200 in FIG. 2 as an example, the packet queue 200 labeled as Q0 corresponds to queue numbering 0, the packet queue 200 labeled as Q1 corresponds to queue numbering 1, and the packet queue 200 labeled as Q2 corresponds to queue numbering 2, so on and so forth.

The packet numbering queue 310 is configured to store the queue numberings of a predetermined amount of the packets PA. As illustrated in FIG. 3, the packet numbering queue 310 can store the queue numberings of 16 packets PA. In an embodiment, packet numbering queue 310 is a first in first out (FIFO) queue.

The allocation circuit 320 is configured to calculate the packet amount of each of the packet queues 200 according to an amount of each of the queue numberings. For example, when the packet numbering queue 310 receives a packet having the queue numbering of 0, the packet amount of the packet queue 200 labeled as Q0 is incremented by 1. When the packet amount that the packet numbering queue 310 is able to store reaches the maximum and a new packet is received, the packet received first in the queue, e.g. the packet having the queue numbering of 1, is removed and the packet amount of the packet queue 200 labeled as Q1 is decreased by 1.

Subsequently, the allocation circuit 320 is configured to determine whether the packet amount is larger than a first threshold value or smaller than a second threshold value, wherein the first threshold value is larger than the second threshold value. When the packet amount is larger than the first threshold value, the allocation circuit 320 controls the available descriptor credit CRN of a corresponding one of the packet queues 200 to be not larger than a maximum credit. When the packet amount is smaller than the second threshold value, the allocation circuit 320 controls the available descriptor credit CRN to be not smaller than a minimum credit.

For example, when the packet amount is larger than 32, the allocation circuit 320 controls the available descriptor credit CRN of the corresponding one of the packet queues 200 to be not larger than 32. When the packet amount is smaller than 2, the allocation circuit 320 controls the available descriptor credit CRN of the corresponding one of the packet queues 200 to be not smaller than 2. By such a design, the condition that some of the packet queues 200 occupy too many credits can be avoided and the efficiency of the usage of the descriptors DE can be increased. Further, the condition that no credit is available when some of the packet queues 200 receive new packets PA can be avoided as well.

It is appreciated that in the numerical example described above, the condition that the first threshold value equals to the maximum credit and the second threshold value equals to the minimum credit is used as an example. In other embodiments, the first threshold value can be different from the maximum credit and the second threshold value can be different from the minimum credit.

In an embodiment, the credit management circuit 230 is configured to manage the descriptors DE by using a link list PLL. More specifically, the credit management circuit 230 is configured to point each of a plurality of public entries of the link list PLL to one of the descriptors DE each stored in one of a plurality of buffer entries of a single descriptor buffer 240. In FIG. 2, the public entries of the link list PLL include PLL0, PLL1, . . . and PLLm. The descriptors DE stored in the buffer entries of the single descriptor buffer 240 include DE0, DE1, . . . and DEm.

In an embodiment, the single descriptor buffer 240 is actually in the memory 110 in FIG. 1. The link list PLL can be stored in an inner memory unit (not illustrated) in the network packet receiving apparatus 130 and can be accessed by the credit management circuit 230.

Further, in an embodiment, for each of the packet queues 200, the requested descriptors DE can be managed by a corresponding queue link list QLL. The queue link list QLL includes a plurality of queue entries. In FIG. 2, the queue entries of the queue link list QLL include QLL0, QLL1, . . . and QLLm.

Reference is now made to FIGS. 4A-4D and FIGS. 5A-5D at the same time. FIGS. 4A-4D are diagrams illustrating the link list PLL and the single descriptor buffer 240 under different operation stages in an embodiment of the present invention. FIGS. 5A-5D are diagrams illustrating the packet queues 200 corresponding to Q0 and Q1 under different operation stages in an embodiment of the present invention.

As illustrated in FIG. 4A, under an initialization status, the credit management circuit 230 makes the public entries PLL0, PLL1, . . . and PLLm of the link list PLL correspondingly point to the descriptors DE0, DE1, . . . and DEm in an order, wherein all the public entries are available public entries. Further, the credit management circuit 230 makes both of the head pointer HEAD and the tail pointer TAIL point to a first one of the public entries, i.e. the public entry PLL0.

As illustrated in FIG. 5A, under the condition that the packet queues 200 corresponding to Q0 and Q1 do not issue the credit requesting command CRR, the queue entries of the queue link list QLL thereof do not store any descriptor. As a result, each of the queue entries is an under-written queue entry. Further, the packet queues 200 sets a write pointer WPTR and a read pointer RPTR both pointing to the first one of the queue entries, i.e. the queue entry QLL0.

In a usage scenario, the packet queue 200 corresponding to Q0 delivers the credit requesting command CRR first. Under the available descriptor credit is within the credit range, the credit management circuit 230 assigns the descriptor DE0 corresponding to the public entry PLL0 to the packet queue 200 corresponding to Q0 and writes the descriptor DE0 to the queue entry QLL0 of the queue link list QLL.

Under such a condition, the credit management circuit 230 makes the head pointer HEAD point to the next available public entry PLL1. The packet queue 200 corresponding to Q0 makes the write pointer WPTR point to the next under-written queue entry QLL1.

Subsequently, the packet queue 200 corresponding to Q1 delivers the credit requesting command CRR. Under the available descriptor credit is within the credit range, the credit management circuit 230 assigns the descriptor DE1 corresponding to the public entry PLL1 to the packet queue 200 corresponding to Q1 and writes the descriptor DE1 to the queue entry QLL0 of the queue link list QLL.

Under such a condition, the credit management circuit 230 makes the head pointer HEAD point to the next available public entry PLL2. The packet queue 200 corresponding to Q1 makes the write pointer WPTR point to the next under-written queue entry QLL1.

The packet queue 200 corresponding to Q0 delivers the credit requesting command CRR again. Under the available descriptor credit is within the credit range, the credit management circuit 230 assigns the descriptor DE2 corresponding to the public entry PLL2 to the packet queue 200 corresponding to Q0 and writes the descriptor DE2 to the queue entry QLL1 of the queue link list QLL.

Under such a condition, the credit management circuit 230 makes the head pointer HEAD point to the next available public entry PLL3. The packet queue 200 corresponding to Q0 makes the write pointer WPTR point to the next under-written queue entry QLL2.

Finally, the packet queue 200 corresponding to Q1 delivers the credit requesting command CRR again. Under the available descriptor credit is within the credit range, the credit management circuit 230 assigns the descriptor DE3 corresponding to the public entry PLL3 to the packet queue 200 corresponding to Q1 and writes the descriptor DE3 to the queue entry QLL0 of the queue link list QLL.

Under such a condition, the credit management circuit 230 makes the head pointer HEAD point to the next available public entry PLL4. The packet queue 200 corresponding to Q1 makes the write pointer WPTR point to the next under-written queue entry QLL2.

As a result, as illustrated in FIG. 4B, after the operations described above are performed, the credit management circuit 230 makes the head pointer HEAD point to the public entry PLL4, in which the tail pointer TAIL still points to the public entry PLL0. Under such a condition, the public entries PLL0-PLL3 are returnable public entries. As a result, as illustrated in FIG. 5B, after the operations described above are performed, the packet queues 200 corresponding to Q0 and Q1 respectively make the write pointer WPTR point to the queue entry QLL2 and make the read pointer RPTR point to the queue entry QLL0.

In a usage scenario, under the status of FIG. 4B and FIG. 5B, the DMA circuit 120 performs DMA operation on the packet PA stored in the packet queue 200 corresponding to Q1 according to the assigned descriptor DE1 to read and transmit the packets to the memory 110.

After the DMA operation is finished, the packet queue 200 corresponding to Q1 moves the descriptor DE1 out of the queue entry QLL0 and makes the read pointer RPTR of the corresponding queue link list QLL point to the queue entry QLL1. Further, the packet queue 200 corresponding to Q1 delivers a credit returning command CBR to the credit management circuit 230. After receiving the credit returning command CBR, the credit management circuit 230 makes the public entry PLL0 that the tail pointer TAIL of the link list PLL points to point to the returned descriptor DE1. The tail pointer TAIL is subsequently controlled to point to the public entry PLL1.

Subsequently, the DMA circuit 120 performs DMA operation on the packet PA stored in the packet queue 200 corresponding to Q1 according to the assigned descriptor DE3 to read and transmit the packets to the memory 110.

After the DMA operation is finished, the packet queue 200 corresponding to Q1 moves the descriptor DE3 out of the queue entry QLL1 and makes the read pointer RPTR of the corresponding queue link list QLL point to the queue entry QLL2. Further, the packet queue 200 corresponding to Q1 delivers the credit returning command CBR to the credit management circuit 230. After receiving the credit returning command CBR, the credit management circuit 230 makes the public entry PLL1 that the tail pointer TAIL of the link list PLL points to point to the returned descriptor DE3. The tail pointer TAIL is subsequently controlled to point to the public entry PLL2.

Subsequently, the DMA circuit 120 performs DMA operation on the packet PA stored in the packet queue 200 corresponding to Q0 according to the assigned descriptor DE0 to read and transmit the packets to the memory 110.

After the DMA operation is finished, the packet queue 200 corresponding to Q0 moves the descriptor DE0 out of the queue entry QLL0 and makes the read pointer RPTR of the corresponding queue link list QLL point to the queue entry QLL1. Further, the packet queue 200 corresponding to Q0 delivers the credit returning command CBR to the credit management circuit 230. After receiving the credit returning command CBR, the credit management circuit 230 makes the public entry PLL2 that the tail pointer TAIL of the link list PLL points to point to the returned descriptor DE0. The tail pointer TAIL is subsequently controlled to point to the public entry PLL3.

As a result, as illustrated in FIG. 4C, after the operations described above are performed, the credit management circuit 230 still makes the head pointer HEAD point to the public entry PLL4 and the tail pointer TAIL points to the public entry PLL3. Under such a condition, only the public entry PLL3 is the returnable public entry. As illustrated in FIG. 5C, after the operations described above are performed, the packet queues 200 corresponding to Q0 and Q1 still make the write pointer WPTR point to the queue entry QLL2. The packet queue 200 corresponding to Q0 makes the read pointer RPTR point to the queue entry QLL1. The packet queue 200 corresponding to Q1 makes the read pointer RPTR point to the queue entry QLL2.

In a usage scenario, under the status of FIG. 4B and FIG. 5B, when the packet queue 200 corresponding to Q0 discovers that the requested amount of the descriptors exceeds the maximum credit for such as 1, the descriptor additionally requested is required to be returned. As a result, the packet queue 200 corresponding to Q0 moves the descriptor DE2 from the queue entry QLL0 and does not modify the read pointer RPTR. The packet queue 200 corresponding to Q0 further delivers the credit returning command CBR to the management circuit 230. After receiving the credit returning command CBR, the credit management circuit 230 makes the public entry PLL0 that the tail pointer TAIL of the link list PLL points to point to the returned descriptor DE2. The tail pointer TAIL is subsequently controlled to point to the public entry PLL1.

As a result, the network packet receiving apparatus 130 of the present invention can control the packet queues 200 corresponding to different channels share the descriptors DE in the single descriptor buffer 240. The disposition of a multiple of descriptor buffers corresponding to different packet queues 200 is not necessary. The waste of the hardware resource can be avoided.

Figure 6:
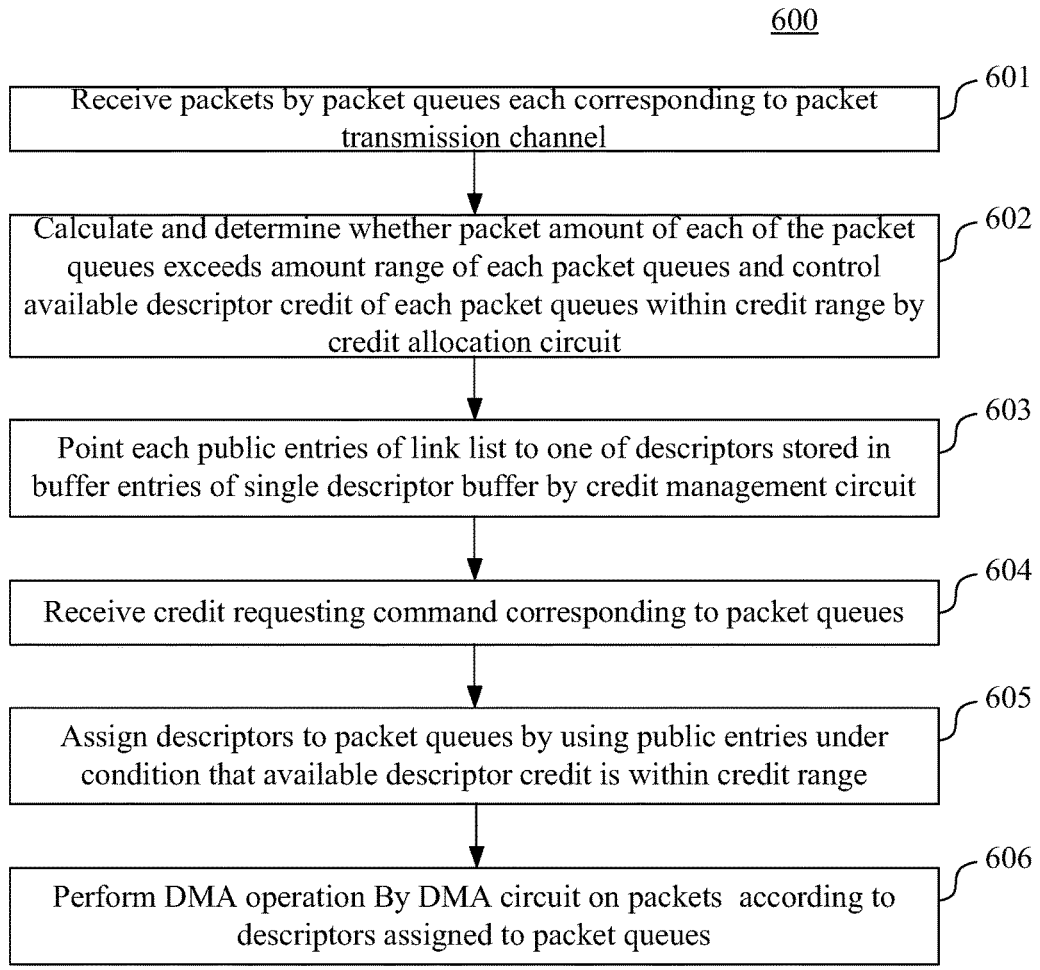
FIG. 6 is a flow chart of a network packet receiving method in an embodiment of the present invention.

Reference is now made to FIG. 6. FIG. 6 is a flow chart of a network packet receiving method 600 in an embodiment of the present invention. The network packet receiving method 600 can be used in the network packet receiving apparatus 130 illustrated in FIG. 1.

The network packet receiving method 600 includes the steps outlined below (The steps are not recited in the sequence in which the operations are performed. That is, unless the sequence of the operations is expressly indicated, the sequence of the steps is interchangeable, and all or part of the steps may be simultaneously, partially simultaneously, or sequentially performed).

In step 601, the packets PA are received by the packet queues 200 each corresponding to the packet transmission channel.

In step 602, the packet amount of each of the packet queues 200 is calculated, whether the packet amount exceeds the amount range of each of the packet queues 200 is determined and the available descriptor credit of each of the packet queues 200 is further controlled within the credit range by the credit allocation circuit 220.

In step 603, each of the plurality of public entries of the link list PLL is pointed to one of the plurality of descriptors DE each stored in one of the plurality of buffer entries of the single descriptor buffer 240 by the credit management circuit 230.

In step 604, the credit requesting command CRR corresponding to the packet queues 200 is received by the credit management circuit 230.

In step 605, the packet queues 200 is controlled to share the single descriptor buffer 240 by the credit management circuit 230 and the descriptors are assigned to the packet queues 200 by using the public entries under the condition that the available descriptor credit is within the credit range.

In step 606, the DMA operation is performed by the DMA circuit 120 on the packets PA according to the descriptors DE assigned to the packet queues 200.

It is appreciated that each of the modules in the processing chip and the chip system or the steps of the chip system operation method described above can be implemented by either hardware, software of firmware according to designer's requirements.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An apparatus comprising:
   a plurality of packet queues each corresponding to a packet transmission channel and configured to receive a plurality of packets;
   a credit allocation circuit configured to calculate a packet amount of each of the packet queues, determine whether the packet amount exceeds an amount range of each of the packet queues and further control an available descriptor credit of each of the packet queues to be within a credit range; and
   a credit management circuit configured to point each of a plurality of public entries of a public link list to one of a plurality of descriptors each stored in one of a plurality of buffer entries of a single descriptor buffer;
   wherein the credit management circuit is further configured to receive a credit requesting command corresponding to the packet queues for controlling the packet queues to share the single descriptor buffer,
   wherein under the condition that the available descriptor credit is within the credit range, the credit management circuit assigns the descriptors to the packet queues by using the public entries, enabling a direct memory access (DMA) circuit to perform a DMA operation on the packets according to the descriptors assigned to the packet queues.

2. The apparatus of claim 1, wherein when the credit management circuit receives the credit requesting command of a requesting packet queue of the packet queues and when a head pointer of the link list points to an available public entry of the public entries, the credit management circuit is configured to assign an available descriptor to the requesting packet queue and make the head pointer points to one of the public entries next to the available public entries, wherein the available public entry points to the available descriptor; and
   when the credit management circuit receives a credit returning command of a returning packet queue of the packet queues and a tail pointer of the link list points to a returnable public entry of the public entries, the credit management circuit is configured to make the returnable public entry points to a returned descriptor returned by the returning packet queue and make the tail pointer point to one of the public entries next to the returnable public entry.

3. The apparatus of claim 2, wherein each of the packet queues comprises a corresponding queue link list that comprises a plurality of queue entries;
when the available descriptor is assigned to the requesting packet queue and a write pointer of the write pointer that the requesting packet queue corresponds to points to an under-written queue entry, the credit management circuit is configured to assign the available descriptor to the under-written queue entry and make the write pointer point to one of the queue entries next to the under-written queue entry; and
when the returned descriptor is returned by the returning packet queue and a read pointer of the queue link list that the returning packet queue corresponds to points to an under-read queue entry of the queue entries, the credit management circuit is configured to move the returned descriptor out of the under-read queue entry and make the read pointer point to one of the queue entries next to the under-read queue entry.

4. The apparatus of claim 2, wherein under an initialization status, the credit management circuit makes the public entries of the link list correspondingly point to the descriptors in an order and makes both of the head pointer and the tail pointer point to a first one of the public entries.

5. The apparatus of claim 1, wherein the credit allocation circuit further comprises:
a packet filtering circuit configured to determine a plurality of queue numberings according to the packet queues that the packets belong to, wherein each of the queue numberings corresponds to one of the packet queues;
a packet numbering queue configured to store the queue numberings of a predetermined amount of the packets; and
an allocation circuit configured to calculate the packet amount of each of the packet queues according to an amount of each of the queue numberings to determine whether the packet amount is larger than a first threshold value or smaller than a second threshold value;
wherein when the packet amount is larger than the first threshold value, the allocation circuit controls the available descriptor credit of a corresponding one of the packet queues to be not larger than a maximum credit, and when the packet amount is smaller than the second threshold value, the allocation circuit controls the available descriptor credit to be not smaller than a minimum credit.

6. A method comprising:
receiving a plurality of packets by a plurality of packet queues each corresponding to a packet transmission channel;
calculating a packet amount of each of the packet queues, determining whether the packet amount exceeds an amount range of each of the packet queues and further controlling an available descriptor credit of each of the packet queues within a credit range by a credit allocation circuit;
pointing each of a plurality of public entries of a public link list to one of a plurality of descriptors each stored in one of a plurality of buffer entries of a single descriptor buffer by a credit management circuit;
receiving a credit requesting command corresponding to the packet queues by the credit management circuit;
controlling the packet queues to share the single descriptor buffer by the credit management circuit and assigning the descriptors to the packet queues by using the public entries under the condition that the available descriptor credit is within the credit range; and
performing a DMA operation by a DMA circuit on the packets according to the descriptors assigned to the packet queues.

7. The method of claim 6, further comprising:
when the credit management circuit receives the credit requesting command of a requesting packet queue of the packet queues and when a head pointer of the link list points to an available public entry of the public entries, assigning an available descriptor to the requesting packet queue and making the head pointer points to one of the public entries next to the available public entries by the credit management circuit, wherein the available public entry points to the available descriptor; and
when the credit management circuit receives a credit returning command of a returning packet queue of the packet queues and a tail pointer of the link list points to a returnable public entry of the public entries, making the returnable public entry points to a returned descriptor returned by the returning packet queue and making the tail pointer point to one of the public entries next to the returnable public entry by the credit management circuit.

8. The method of claim 7, wherein each of the packet queues comprises a corresponding queue link list that comprises a plurality of queue entries, The method further comprises:
when the available descriptor is assigned to the requesting packet queue and a write pointer of the write pointer that the requesting packet queue corresponds to points to an under-written queue entry, assigning the available descriptor to the under-written queue entry and making the write pointer point to one of the queue entries next to the under-written queue entry by the credit management circuit; and
when the returned descriptor is returned by the returning packet queue and a read pointer of the queue link list that the returning packet queue corresponds to points to an under-read queue entry of the queue entries, moving the returned descriptor out of the under-read queue entry and making the read pointer point to one of the queue entries next to the under-read queue entry by the credit management circuit.

9. The method of claim 7, further comprising:
under an initialization status, making the public entries of the link list correspondingly point to the descriptors in an order and making both of the head pointer and the tail pointer point to a first one of the public entries by the credit management circuit.

10. The method of claim 6, wherein the step of controlling the available descriptor credit of each of the packet queues within the credit range by the credit allocation circuit further comprises:
determining a plurality of queue numberings according to the packet queues that the packets belong to by a packet filtering circuit, wherein each of the queue numberings corresponds to one of the packet queues;
storing the queue numberings of a predetermined amount of the packets by a packet numbering queue; and calculating the packet amount of each of the packet queues according to an amount of each of the queue numberings to determine whether the packet amount is larger than a first threshold value or smaller than a second threshold value by an allocation circuit;

wherein when the packet amount is larger than the first threshold value, the allocation circuit controls the available descriptor credit of a corresponding one of the packet queues to be not larger than a maximum credit, and when the packet amount is smaller than the second threshold value, the allocation circuit controls the available descriptor credit to be not smaller than a minimum credit.

* * * * *